US005524787A

United States Patent [19]
Blake et al.

[11] Patent Number: 5,524,787
[45] Date of Patent: Jun. 11, 1996

[54] LIGHTWEIGHT, COMPOSITE CONTAINER

[75] Inventors: Alan D. Blake, Overijse; Andre M. G. Jacobs, Zemst; Annick A. S. Van Put, Brasschaat, all of Belgium

[73] Assignee: The Procter & Gamble Company, Cincinnati, Ohio

[21] Appl. No.: 500,916

[22] PCT Filed: Jan. 28, 1994

[86] PCT No.: PCT/US94/01066

§ 371 Date: Aug. 2, 1995

§ 102(e) Date: Aug. 2, 1995

[87] PCT Pub. No.: WO94/18076

PCT Pub. Date: Aug. 18, 1994

[30] Foreign Application Priority Data

Feb. 2, 1993 [EP] European Pat. Off. ............. 93870020

[51] Int. Cl.$^6$ .................................................. B65D 25/14
[52] U.S. Cl. ..................... 220/410; 220/400; 220/771; 215/12.1; 215/398
[58] Field of Search ..................... 215/12.2, 12.1, 215/11.3, 396, 398, 386, 390; 220/400, 410, 408, 771; 222/465.1, 466

[56] References Cited

U.S. PATENT DOCUMENTS 2,954,901 10/1960 Winstead ................................. 220/410
3,160,326 12/1964 Sturdevant et al. ..................... 222/183
3,765,574 10/1973 Urquiza ................................... 215/398
4,195,728  4/1980 Cardamone ........................... 206/45.33
4,281,769  8/1981 Ignell ..................................... 215/12.2
4,342,399  8/1982 Stirling .................................. 215/12.2
4,437,575  3/1984 Hahn ...................................... 220/410
4,671,452  6/1987 Pupp et al. ........................... 222/465.1
4,796,937  1/1989 Andrea .................................. 294/31.2
4,960,225 10/1990 Gillis .................................... 220/85 H
5,087,406  2/1992 Krall et al. ............................ 264/512
5,122,399  6/1992 Farrell et al. ......................... 215/12.2
5,299,700  4/1994 Beniacar ............................... 215/12.1
5,322,184  6/1994 Bergner et al. ....................... 215/12.1
5,366,102 11/1994 Bergner et al. ....................... 215/12.1
5,413,232  5/1995 Bergner et al. ....................... 215/398

FOREIGN PATENT DOCUMENTS 9216420 10/1992 WIPO ................................... 220/410

Primary Examiner—Stephen J. Castellano
Attorney, Agent, or Firm—Ronald W. Kock

[57] ABSTRACT

A composite package comprising an inner plastic container and an outer sleeve, wherein the outer sleeve has an aperture cut into it in the region of one of its edges. The inner plastic container has an integral plastic handle formed along part of one of its edges. When the package is assembled, the aperture in the outer sleeve corresponds with the plastic handle of the inner container, thereby allowing the composite package to be picked up and handled by means of the plastic handle.

8 Claims, 3 Drawing Sheets

LIGHTWEIGHT, COMPOSITE CONTAINER

BACKGROUND OF THE INVENTION

This invention relates to composite containers having an integral plastic handle. The composite containers are comprised of at least two components which may be separated after use, for ease of recycling. An inner container is a lightweight plastic bottle, and an outer layer is a sleeve which provides some structural support to the inner container.

The use of plastic bottles with integral handles to facilitate the lifting and pouring of the bottle has been common place, and such bottles are used by almost every supplier of liquid consumer products. Methods of improving the design and shape of the handle have been sought.

U.S. Pat. No. 4,368,827, published on 18th Jan. 1983 is one such example of this. This patent describes a plastic handle located on one edge of a plastic bottle. However the handle does not form a continuous edge, and it states that a lightweight, extrusion blow molded bottle is difficult to make with a full, integral hollow handle because a parison of relatively large thickness is required.

The use of plastic bottles which are supported by an outer sleeve has been proposed before:

CA 474 542, published 19th Jun. 1951, is aimed at providing a container for safely storing chemical reagents, especially those reagents which attack glass. The patent describes a polyethylene bottle having ribs or lugs molded on the outer surface of the bottle side wall, and a substantially rigid band (eg. paperboard) held in position around the outside of the bottle by the ribs or lugs. It is foreseen that the rigid band will be used as a gripping surface, and no separate handle is disclosed.

U.S. Pat. No. 3,160,326, published on 8th Dec. 1964, describes a lightweight plastic bottle which is supported by an outer cardboard sleeve. A handle is provided by means of tongues cut into the cardboard sleeve which, when folded into a recess in the plastic bottle, may be gripped by the consumer.

U.S. Pat. No. 4,782,945, published on 8th Nov. 1988, provides a plastic bottle and carrier assembly adapted to facilitate recycling. The bottle carriers described in this patent are intended to be reusable, whereas the bottles themselves can be recycled.

WO 91 00223, published on 10th Jan. 1991, describes a lightweight, plastic bottle which is supported by an outer cardboard sleeve. Cardboard tongues serve to form a handle and to lock the outer sleeve in position. It is preferred that the gripping part of the handle is formed exclusively from cardboard, and not from any part of the plastic bottle.

DE 40 33 617, published on 30th Apr. 1992, also describes a lightweight, plastic bottle which is supported by an outer cardboard sleeve. In this patent application the gripping part of the handle is formed by a combination of both of the cardboard tongues and the plastic bottle.

It is the objective of the present invention to provide a composite container which facilitates the handling of the container by the consumer, in particular the lifting of the container by the consumer and pouring from the container.

It is a further objective of the present invention that it allows the consumer to take a firm and positive grip on the plastic of the container, unlike the prior art containers which gripping forces are transmitted through the outer sleeve to the inner container.

It is a further objective of the present invention to provide a composite container which may be readily recycled. In order to achieve this, the inner part of the container is made from a lightweight plastic, which is given further structural support by an outer sleeve which is made of paper, cardboard, etc.

SUMMARY OF THE INVENTION

A composite package comprising an inner plastic container and an outer sleeve, wherein the outer sleeve has an aperture cut into it in the region of one of its edges. The inner plastic container has an integral plastic handle formed along part of one of its edges.

When the package is assembled, the aperture in the outer sleeve corresponds with the plastic handle of the inner container, thereby allowing the composite package to be picked up and handled by means of the plastic handle.

BRIEF DESCRIPTION OF THE DRAWINGS

FIG. 1 shows a schematic perspective view of a composite container comprised of two components.

FIG. 4 shows a cross-section taken through the container (N.B. the thicknesses of the walls of the inner container and the outer sleeve have been exaggerated for clarity).

DETAILED DESCRIPTION OF THE INVENTION

Figure 1A:
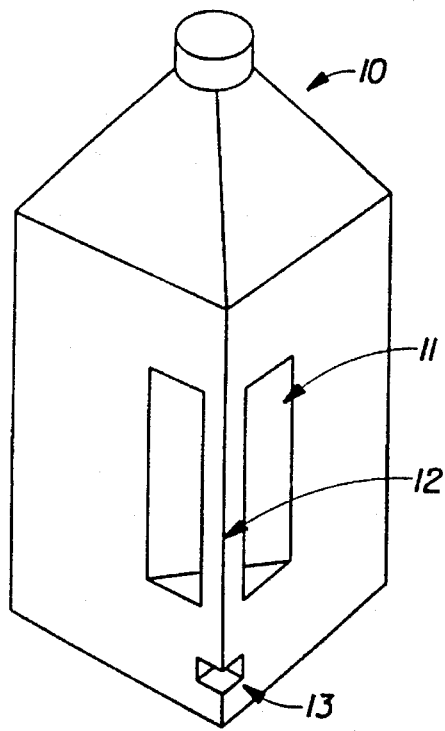
FIG. 1a shows the inner container (10), and the outer sleeve (20). The inner container has a handle (11) formed around one of its edges (12). The container also has a locking cavity (13).
Figure 1B:
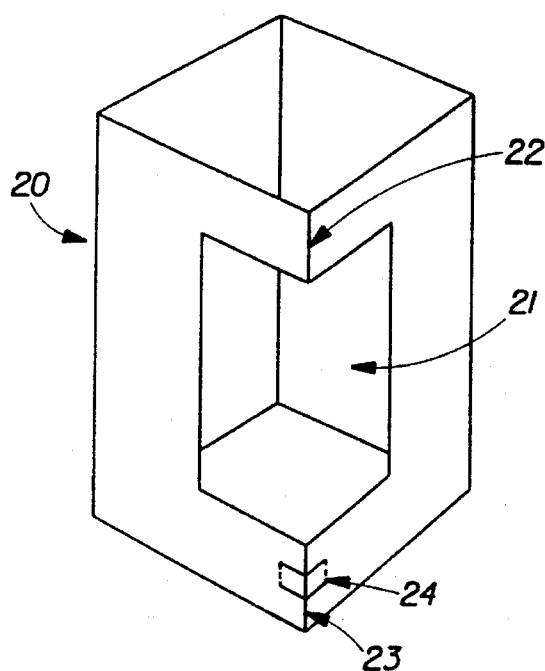
FIG. 1b shows the sleeve (20) in its erected form. The sleeve has an aperture (21) which divides one of the edges into an upper edge section (22) and a lower edge section (23). The lower edge section is further broken by a hinged locking tab (24).
Figure 2:
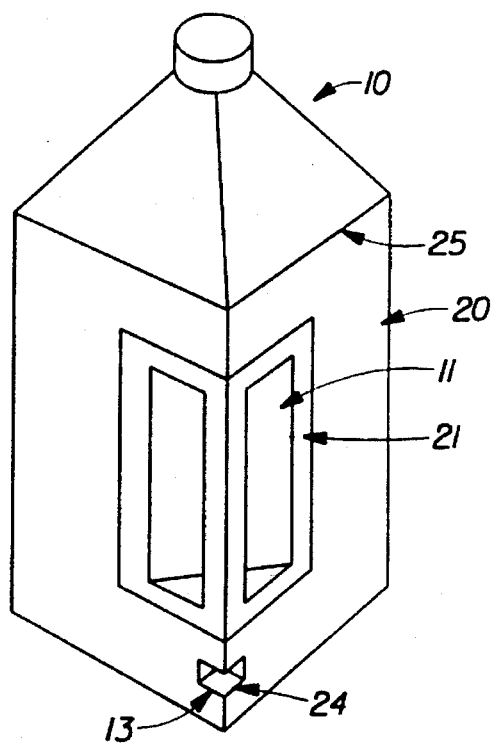
FIG. 2 shows a schematic perspective view of the composite container after the outer sleeve has been located over the inner container and the locking tab (24) has been hinged inwards into the corresponding cavity of the container in order to lock the two components together.

The composite container comprises at least two components. One of these components is a plastic container having an integral handle along one of its edges. Another component is a sleeve which substantially encloses the container.

In a preferred embodiment of the invention the plastic container is designed to be lightweight, and the sleeve is designed to give the required structural rigidity to the composite container.

The Plastic Container

It is the aim of the present invention that the plastic container should be lightweight. It is intended that the container should be rigid enough to support its own weight without deformation when it is allowed to stand without containing any product. However it is a feature of the present invention that the container does not need to be rigid enough to resist the deformation forces caused by the weight of the product when the container is filled. In this condition the container may bulge, or be unstable due to the weight of the product within it. It is intended that the necessary rigidity to resist this bulging or instability will be provided, at least in part, by the outer sleeve.

Strengthening ribs or depressions may be incorporated into the walls of the inner container in order to increase structural rigidity of the container, which may enable the overall weight of the container to be further optimised. optionally the outer surface of the container may be textured.

The plastic container may be made by any suitable process including extrusion blow molding, injection blow molding, stretch blow molding and orientation blow molding. The preferred manufacturing method is extrusion blow molding. Using this technique, an extruder initially forms large diameter preforms, hollow tubes known as parisons. The parison is then pinched between two halves of a blow mold, the inside of the mold having the desired final shape of the container. In each blow mold a portion of the parison is pinched off to form a handle shape and the pinched parison is blown to its final bottle dimensions with a hollow handle and an interconnecting web. The web is then removed to provide a handle for lifting and pouring.

The parison must be pinched between the two halves of the mold. The result of this is that the split line of the mold lies along the handle of the finished bottle.

U.S. Pat. No. 4,368,827 suggests that a plastic container with an integral plastic handle is difficult to make as a lightweight bottle. This has indeed proved to be the case in practice because of the unequal distribution of plastic which occurs around the container when the extrusion blow molding technique described above is used. In order to maintain the compression strength of the container at its weakest point (which is usually along the edge which is opposite to the handle), it is necessary to use a thicker parison which results in a heavier container. However, the present invention addresses this problem by using an outer sleeve to carry much of the compressive load on the container, thereby overcoming the disadvantages arising from the uneven distribution of plastic around the container. In this way it is now possible to use a thinner parison to make a lightweight container with a handle, without the disadvantages of weaknesses due to uneven distribution of plastic around the container.

An alternative, although less preferred manufacturing technique, is stretch blow molding. This technique enables the manufacture of containers which have an integral handle which is solid, rather than hollow.

Any suitable thermoplastic material may be used to make the inner container, however preferred materials include polyethylene, polypropylene, polyester, polyvinylchloride, polyethylene terephthalate, polyethylene terephthalate with glycol additive or mixtures thereof. The container may be made partly or fully out of recycled plastic materials. Furthermore the inner container may be laminated in more than one layer. However it is preferred that the container is transparent or semitransparent to the extent that the level of product inside the container can be seen when looked at from the outside.

The cross-section of the inner container may be any desired shape, subject to the requirement that it has a integral handle lying along an edge. However, the cross-section may be triangular, square, rectangular, rhomboidal, pentagonal, or any other geometric shape which may or may not have sides of equal length. Furthermore some of the surfaces may be curved, rather than flat. Furthermore the cross-section may vary at different distances from the base of the container.

Figure 4A:
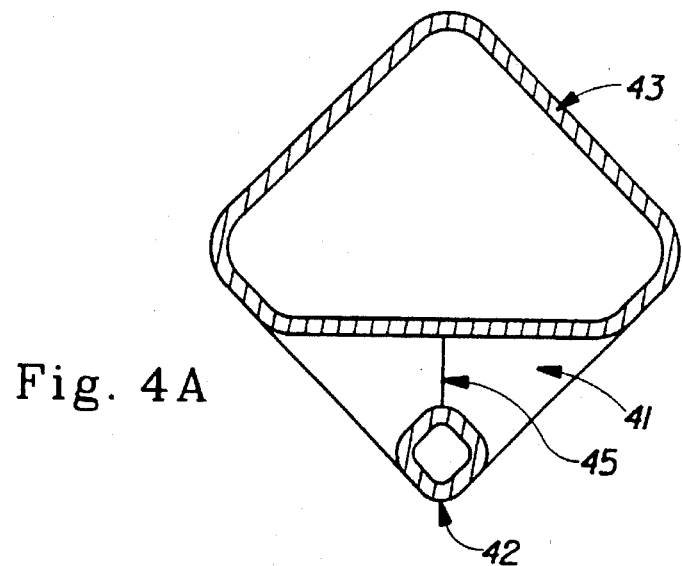
FIG. 4a shows a cross-section taken through an inner container (43) having a hollow handle (42)

A typical container is illustrated in FIG. 1a. This figure illustrates a container having a split line along the edge, 12, and a handle, 11, which has been formed by pinching the parison as in the extrusion blow molding process described above. The container also has a locking cavity (13) which has the form of a depression in the wall of the container. FIG. 4a shows the cross-section of such a container. This view shows a hollow handle (42) and the dotted line (45) indicates were the interconnecting web has been removed.

The Outer Sleeve

The outer sleeve may be made from any suitable material, such as paper, cardboard, or thermoplastic. Paper or cardboard has the advantage that it allows the total weight of plastic in the composite container to be minimised, and still allows the sleeve to be easily separated from the container; whereas a plastic sleeve has the advantage that there is no need to separate the components of the composite container prior to recycling.

In the case of a plastic sleeve, the sleeve may be wrapped around the container and glued into position, alternatively the sleeve may be fixed around the container by any suitable process such as heat-shrinking or stretch-wrapping. Although many variations will be apparent to the man skilled in the art, the preferred method is stretch-wrapping of a polyethylene sleeve.

However, rather than plastic, the outer sleeve is more preferably formed from a pre-cut blank of paper or cardboard, which is then erected. The inner cross-section of the erected blank should correspond substantially to the outer cross-section of the sleeve.

In a preferred embodiment of the present invention the erected blank is a four-sided tube which is open at both its bottom and top ends.

Figure 3:
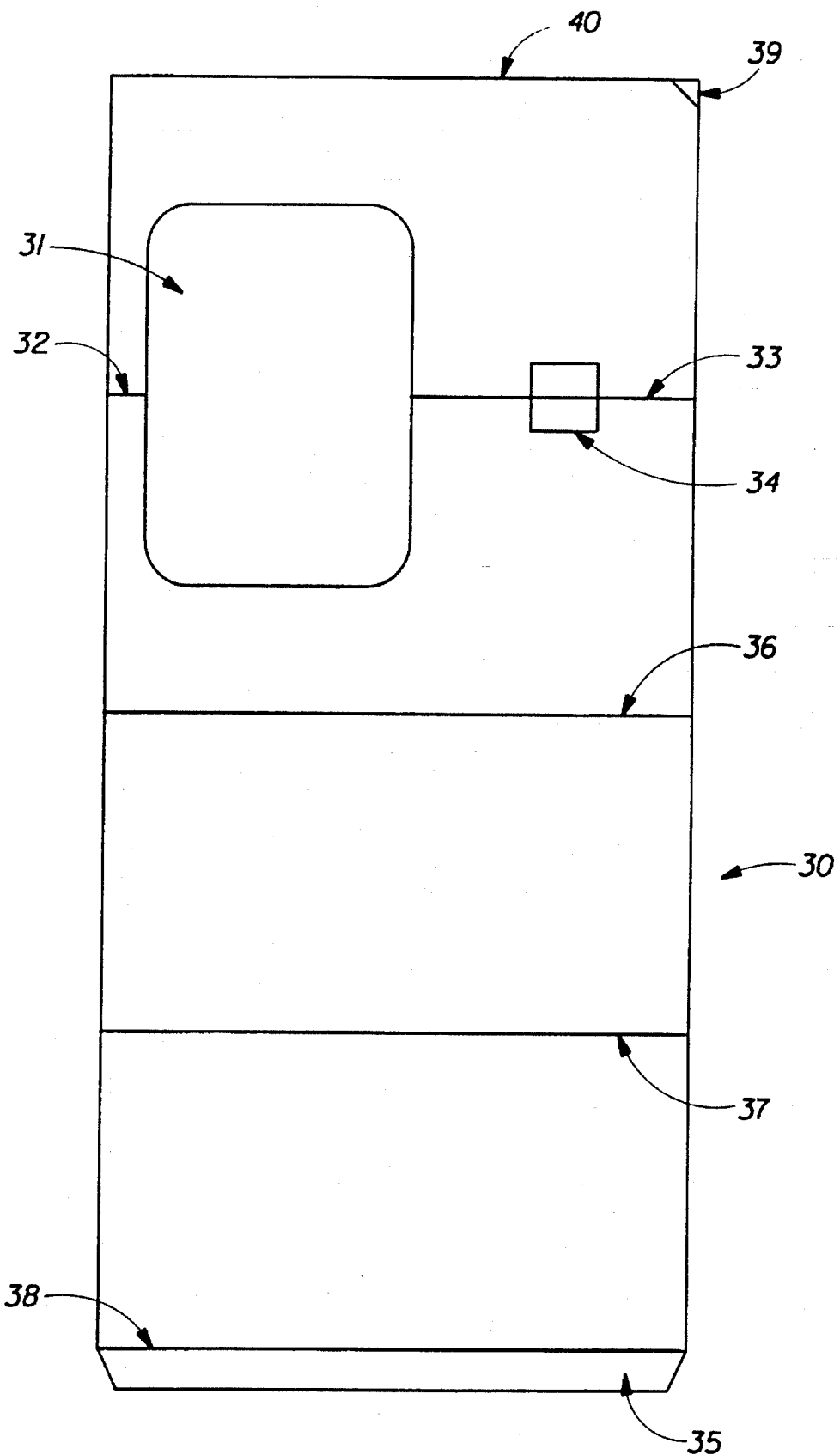
FIG. 3 shows a suitable blank (30) for forming the cardboard sleeve. The sleeve is erected by folding the blank along the fold lines (32/33, 36, 37, 38) which then form the edges of the sleeve, and securing the tab (35) to the opposite edge (40) of the blank. The blank also comprises a tear tab (39), which enables the consumer to readily tear the sleeve along or adjacent to the fold line, (38).

An example of a pattern for a pre-cut blank is shown in FIG. 3. The blank is erected in order to form the outer sleeve (20). In order to erect the blank, it is folded along the fold lines (32/33, 36, 37, 38) and a tab (35) is glued adjacent to the opposite edge (40) to form a seam.

The blank has a predetermined area which is cutaway, (31), and which is designed to allow the consumer to put their fingers through the aperture of the outer sleeve and to directly grip the plastic handle of the composite container. The blank illustrated in FIG. 3 is designed to have a seam on one of the edges which is adjacent to the edge containing the aperture. However, this arrangement is not essential to the invention, indeed in the preferred design the seam is on the edge opposite to the aperture.

The feature of a tear mechanism, preferably with an associated tear tab is also foreseen in the preferred embodiment of the outer sleeve. The tear mechanism may be provided in any convenient way; for example, a tear string fixed inside the sleeve, or a line of perforations along which the sleeve may be readily torn. In a preferred embodiment of the invention the tear mechanism is provide along the seam of the sleeve. A tear tab (39) is provided which enables the consumer to readily tear the sleeve along, or adjacent to the fold line (38).

The cardboard or paper from which the outer sleeve is made in this embodiment of the invention, may be any suitable material such as Kraft, coated Kraft, Kraft laminated with paper, coated greyboard or coated greyboard with paper. The thickness (or caliper) of cardboard or paper will be chosen to provide the necessary structural rigidity to the composite container. It has been found that a caliper of about 360 grammes per square meter, or 415 grammes per square meter is particularly suitable for use in the present invention.

The Composite Container

Figure 5:
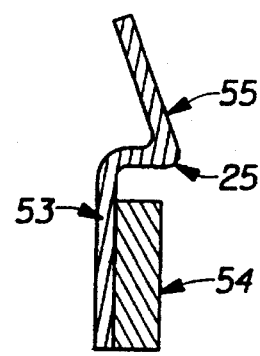
FIG. 5 shows an exploded view of a ridge projecting outwards from the outer surface of the inner container at its shoulder (25). The raised ridge lies adjacent to the upper free edge of the outer sleeve.

In order to assemble the composite container, the components are brought together and locked by a suitable locking mechanism. The components may be locked together by using an adhesive; however, this is not preferred because it makes it more difficult for the consumer to separate the components after the container has been emptied. It is preferred that the locking function is achieved by means of raised ribs or projections on the outer surface of the inner container which correspond with either the some or all of the edges of the outer sleeve (FIG. 5), or which correspond with holes cut out of the outer sleeve. Alternatively, the locking mechanism may take the form of cavities or depressions in the outer surface of the inner container which correspond to tabs or tongues in the outer sleeve which are then folded into the cavities or depressions. Most preferred is a combination of these locking mechanisms, for example comprising the raised shoulder on the inner container which lies adjacent to the upper free edge of the sleeve (FIG. 5), as well as a locking cavity in the container (13) which corresponds to a locking tab (24) in the outer sleeve. The tab is pressed into the cavity in order to achieve positive locking.

In the embodiment of the invention in which the outer sleeve is made of plastic which is attached by gluing, heat-shrinking, or shrink-wrapping, then no additional locking mechanism is necessary.

Although not essential, it is preferred that the composite container is assembled, and the components are locked together, before the container is filled. This avoids the problem of fitting the sleeve over a container which is bulging due to the weight of its contents.

A suitable sequence of steps to assemble the completed composite container is:

a) an inner thermoplastic container (10) is made by extruding a parison into a two piece mold, said mold when closed pinches said parison over an area which is fused together forming an interconnecting web;

b) removing the interconnecting web to define a handle (11);

c) cutting an aperture (31) into carton blank (30);

d) erecting the carton blank to form an outer sleeve (20), wherein said sleeve comprises at least two flat surfaces which intersect at an edge, said aperture (21) being located such that it divides the edge into an upper edge section (22) and a lower edge section (23);

e) positioning outer sleeve over inner container such that the aperture (21) of the sleeve (20) is positioned over the handle (11) of the container (10);

f) optionally, pressing a tab or tongue (24) of the outer sleeve (20) into a depression or cavity (13) of the inner container (10) in order to lock the components together.

Figure 4B:
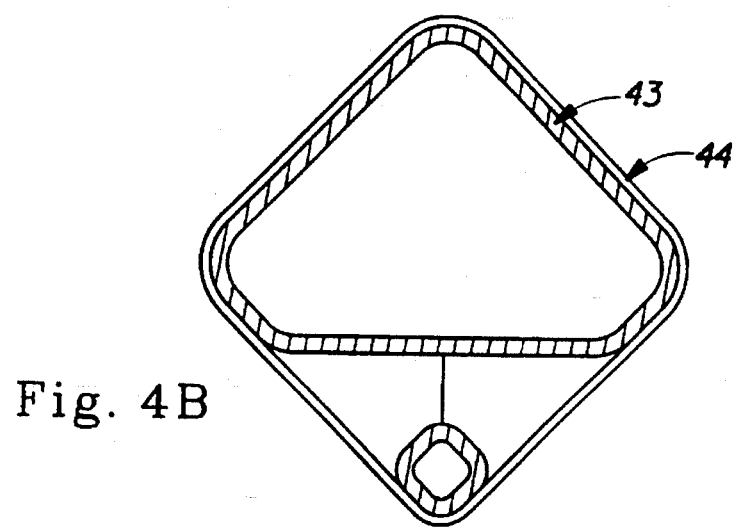
FIG. 4b shows a cross-section taken through a composite container showing the inner container (43) and the outer sleeve (44).

A typical cross-section of a composite container is shown in FIG. 4b.

What is claimed is:

1. A composite package comprising an inner plastic container (10) and an outer sleeve (20), said sleeve having an inner surface and an outer surface and having at least two surfaces which intersect at an edge (22,23), a substantial part of said inner surface being in contact with the plastic container, wherein a predetermined area of the sleeve is cut away in the region of an edge of the sleeve to form an aperture (21) which defines an upper edge section (22) and a lower edge section (23), said aperture corresponds to a handle (11) which is integrally formed into the plastic container, said handle being defined by two openings which are located on either side of one of the edges (12) of the plastic container.

2. A composite package according to claim 1 wherein the outer sleeve (20) has four sides in the form of a tube which has an open top end and an open bottom end.

3. A composite package according to claim 1, wherein the outer sleeve (20) is made from Kraft, coated Kraft, Kraft laminated with paper, coated greyboard or coated greyboard with paper, said sleeve having a caliper of at least 360 grammes per square meter.

4. A composite package according to claim 1 wherein the inner container is made from thermoplastic material, by extrusion blow molding.

5. A composite package according to claim 4 which further comprises a locking mechanism (13, 24) which holds the components of the composite container together.

6. A composite package according to claim 4 wherein the inner container (10) comprises one or more raised edges (55) adjacent to part or all of one or more of the free edges of the outer sleeve.

7. A composite package according to claim 5, wherein the inner container (10) comprises a cavity or depression (13) into which a tab or tongue (24) of the sleeve can be located.

8. A composite package according to claim 3, wherein said sleeve has a caliper of at least 415 grammes per square meter.

* * * * *